(No Model.)
W. A. KONEMAN.
APPARATUS FOR UTILIZING PRODUCER GAS AS FUEL FOR CALCINING LIMESTONE.
No. 513,945.  Patented Jan. 30, 1894.
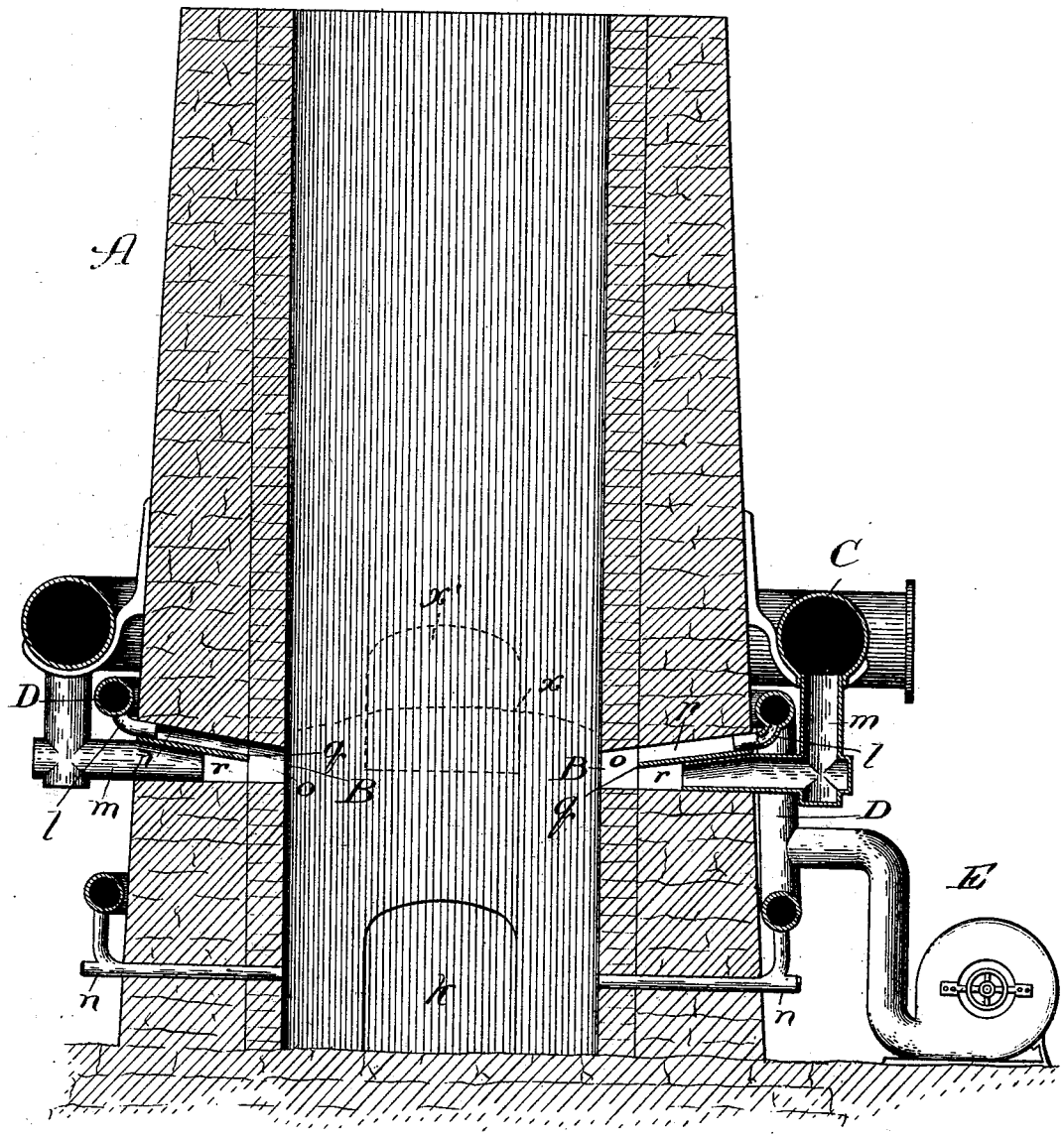

UNITED STATES PATENT OFFICE.

WILLIAM A. KONEMAN, OF CHICAGO, ILLINOIS, ASSIGNOR TO THE CHICAGO HEAT STORAGE COMPANY, OF SAME PLACE.

APPARATUS FOR UTILIZING PRODUCER GAS AS FUEL FOR CALCINING LIMESTONE.

SPECIFICATION forming part of Letters Patent No. 513,945, dated January 30, 1894.

Application filed June 23, 1892. Serial No. 437,679. (No model.)

*To all whom it may concern:*

Be it known that I, WILLIAM A. KONEMAN, a citizen of the United States, residing at Chicago, in the county of Cook and State of Illinois, have invented a new and useful Improvement in Apparatus for Utilizing Producer Gas as Fuel for Calcining Limestone, of which the following is a specification.

Producer-gas, or gas of low calorific power, by reason of its cheapness, is a very desirable fuel for use in calcining limestone to produce lime, provided it can be caused by combustion to generate sufficient heat at the proper point in the kiln. The point referred to is that of "sticking" the kiln, a term employed to express the wedging of the limestone between the kiln-walls by its expansion under the influence of the generated heat, which must be very intense to effect it. This sticking point should be at the base of the column of limestone, since lime is not properly burned unless with an adequate degree of heat for sticking it; hence it follows that unless the sticking of the kiln be produced at the base of the column of limestone, it will take place higher up in the column, according to the point therein at which complete combustion of the fuel, in rising through it, takes place, with the undesirable consequences that the mass of stone below that point is insufficiently burned, affording a poor or even worthless product, and that great difficulty is incurred, owing to the comparative inaccessibility of the sticking point, in dislodging the calcined mass to effect precipitation thereof. To render producer gas, which is inherently low in calorific power, suitable for the purpose, I introduce it simultaneously into opposite sides of the kiln and burn it near the desired sticking point or base of the limestone column therein, and forcibly introduce air with the gas, under a blast pressure, but in a horizontal plane above that of the gas-introduction. Thus I accomplish three important requirements for the successful burning: First, the gas and air, being forced under considerable pressure horizontally into the kiln and against the interposed stratum of limestone, become intimately mixed and reduced to a condition for thorough combustion of the fuel and generation of the requisitely great heat, at the desired sticking point at the base of the column of limestone; second, by forcibly introducing the air in a plane over that of the gas-introduction, the gas is held down near its said plane the longer, thereby the more effectually preventing its rise, before reduction to a condition of thorough combustion, in the limestone column; and, third, the forcible intermixture of the gas and air by the air-blast (or, if desired, by forcing in the gas with a blast instead of the air) prevents the draft through the open top of the kiln from producing objectionable "wall-climbing" of the products of combustion—so common in lime-kilns and which causes irregular burning of the limestone—and insures forcible distribution of the hot products of combustion in rising through the entire mass of the column and their escape at the top in a thoroughly spent condition.

My improved apparatus is illustrated in the accompanying drawing by a view in sectional elevation.

A is a lime-kiln involving any suitable or well-known general construction. At a desired height above the base of the kiln, through the wall thereof, are openings B divided by diaphragms $q$ into gas-inlets $r$ and air-inlets $p$, which should unite at the inner ends of the diaphragms, which extend short of the inner surface of the kiln-chamber and form mixing and combustion chambers $o$. An air-supply leads into the kiln near its base, tuyeres $n$ being shown as the medium for the supply.

C is a gas-supply pipe, leading from a generator or other supply (not shown) of producer gas, or cheap gas of low calorific power, and having branches $m$ leading into the openings $r$; and D is an air-pipe having branches $l$ leading into the openings $p$, the pipe D communicating with a fan E. If desired the air-supply to the tuyeres $n$ may be from the fan E, by connecting them with the pipe D; though a separate fan for the tuyeres may be provided, and thereby avoid provision of pressure-reducing means, which may be otherwise required in the communication of the tuyeres with the pipe D.

To understand the operation, it is to be presumed that the base, or draw-pit, of the kiln A is filled up to the dotted line $x$, with the finished product of a burning in a highly heated condition, and which has been precipitated into the pit. From the line $x$ the kiln is filled with limestone to be burned. The fan E being set in motion, air is forced under pressure into the kiln through the openings $p$; and, the supply of gas from the pipe C, admitted to the openings $r$, and ignited in the kiln, is drawn in with considerable force. The gas and air commingle in the mixing-chambers $o$; and the pressure at which they are introduced overcomes their tendency to stratify and rise separately and causes them to combine so intimately in the kiln about where they are introduced therein, as to induce thorough combustion of the fuel near the point of its introduction, whereby all, or practically all, the heat of complete combustion is expended on the material above the line $x$, in passing through it, and only the thoroughly spent products of combustion escape from the top, whereby there is the minimum of waste and the greatest heat is imparted by the products of combustion to that portion of the lime-stone which lies in the plane of the combustion-chambers $o$. Meantime air, under more or less pressure, is introduced through the openings represented by tuyeres $n$ through the pile of hot lime in the pit, being thereby thoroughly heated; and it commingles with the fuel from the openings B and enhances the combustion thereof. When the burning is finished, the fuel-supply should be turned off, and the contents of the pit are withdrawn through the opening $k$ to enable the newly burned product to be precipitated and form the bed for the next burning. The kiln will be found to have been "stuck," as aforesaid, forming an arch, represented by the line $x$, at the proper point, and requiring the burned mass to be dislodged for precipitation; for which purpose it is common to insert probing-bars into the kiln through suitable openings, one of which is represented at $x'$, and to be provided with means for closing it, as usual. Then the kiln is ready for another burning operation; and the proceeding is carried on as described.

The product of the described treatment in my improved apparatus is of excellent quality, being uniformly burned throughout the kiln, of a high degree of whiteness, and exceptionally free from grout; and moreover the cheap quality of gas which is rendered serviceable by the provision I make for forcing its complete combustion at the base of the material to be burned in the kiln, renders the treatment exceptionally economical and inexpensive.

What I claim as new, and desire to secure by Letters Patent, is—

In combination, a lime-kiln A having a draw-pit and uncovered at its upper end, openings B in opposite sides of the kiln near the "sticking" point therein and divided into upper air-inlet passages $p$ and lower gas-inlet passages $r$, a gas-supply pipe C leading into the passages $r$, an air-supply pipe D leading into the passages $p$, and a blast-fan E communicating with the said air-pipe, substantially as and for the purpose set forth.

WILLIAM A. KONEMAN.

In presence of—
M. J. FROST,
J. N. HANSON.